Sept. 14, 1954  E. B. POOL  2,688,980
VALVE EQUALIZER
Filed Jan. 13, 1949  2 Sheets-Sheet 1
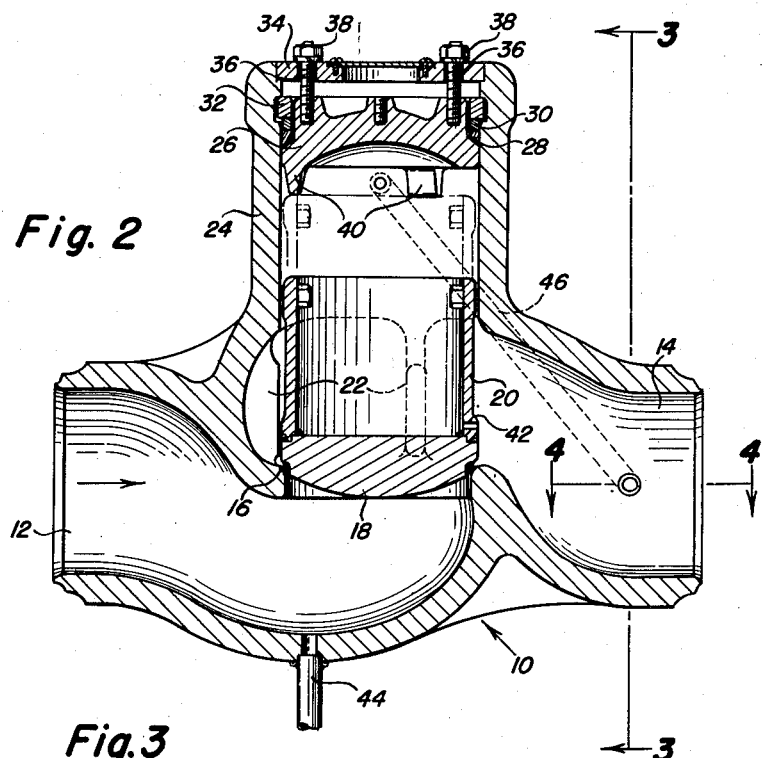
Fig. 2
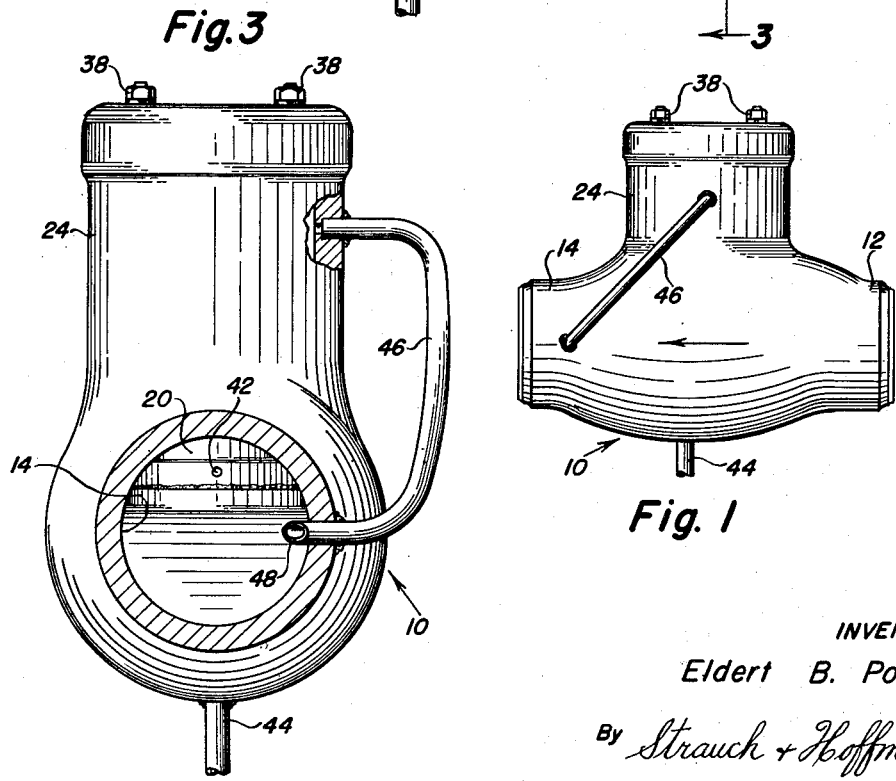
Fig. 3
Fig. 1
INVENTOR
Eldert B. Pool
By Strauch + Hoffman
Attorneys Sept. 14, 1954     E. B. POOL     2,688,980
VALVE EQUALIZER Filed Jan. 13, 1949                                   2 Sheets-Sheet 2

$W\sqrt{V}$ = FLOW RATE (LB./HR) x SQ. ROOT OF SPECIFIC VOLUME (CU.FT./LB.)

INVENTOR
Eldert B. Pool

By Strauch & Hoffman
Attorneys

Patented Sept. 14, 1954

2,688,980

UNITED STATES PATENT OFFICE 2,688,980

VALVE EQUALIZER

Eldert B. Pool, Riverside, Ill., assignor to Edward Valves, Inc., Pittsburgh, Pa., a corporation of Pennsylvania Application January 13, 1949, Serial No. 70,750

8 Claims. (Cl. 137—514)

This invention relates to valves of the piston type and of either the angle or globe form. The invention has for its general object and purpose to provide a simple and effective means for equalizing pressure in the valve outlet and above the valve piston to insure movement of the piston under fluid pressure to its fully open position thereby maintaining a minimum pressure drop through the valve.

In the ordinary piston type check valve, relatively high pressures are built up over the valve piston, due to the conversion of fluid velocity into static pressure as the fluid flows to the valve outlet. No effective vent is provided for such pressure, which resists the lifting movement of the valve piston from its seat as the fluid flow increases. Movement of the piston is thus limited to a partially open position so that the valve will operate over only a small range of fluid flows without excessive pressure drop. Since the piston cannot be rigidly held in this partially open position, vibration and wear materially reduces the life of the valve, especially when operating conditions require long periods of operation at reduced loads.

It is therefore a more particular object of the invention to provide an external pressure equalizing tube connected at one end with the space above the valve piston and at its other end with a point of low pressure in the valve outlet, thus relieving the high pressure above the piston and assuring movement thereof to its full open position with a wide range of fluid flows.

It is a further object in one embodiment of my invention to obtain a maximum pressure relief above the piston by projecting one end of the equalizing tube into the valve outlet with the open end of the tube extending at a horizontal angle of substantially 45° toward the axis of the outlet and facing in the down-stream direction, thus taking advantage of the reverse velocity head of the fluid at the equalizer outlet.

It is also an additional object of the invention to provide an improved arrangement of stop lugs limiting movement of the valve piston to prevent closure of the equalizer tube inlet and stabilizing the piston in its full open position to minimize vibration and wear thereof.

With the above and other objects in view, the invention resides in the improved piston type check valve as will hereinafter be more fully described, illustrated in the accompanying drawing and subsequently incorporated in the sub-joined claims.

In the drawing wherein I have disclosed one simple and practical embodiment of my present improvements and in which similar reference characters designate corresponding parts throughout the several views:

Figure 1 is a side elevation illustrating one preferable application of my improved pressure equalizer to a globe check valve;

Figure 2 is a vertical longitudinal section of the valve on an enlarged scale;

Figure 3 is a vertical transverse sectional view taken substantially on the line 3—3 of Figure 2;

Figure 4:
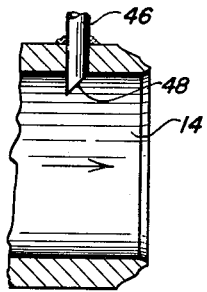
Figure 4 is a detail horizontal section taken on the line 4—4 of Figure 2.

As shown in Figures 1 to 3 of the drawings, the valve body 10 is formed with horizontally aligned inlet and outlet extensions 12 and 14 respectively provided with welding ends or other suitable means for connection with the up-stream and down-stream sections of the pipe line. Between the inlet and outlet, the valve body is internally formed with a valve seat 16 upon which the relatively heavy disc 18 closing the lower end of the tubular valve piston 20 is normally seated.

The valve body is also internally formed above the seat 16 with suitable guide means 22 for the piston 20 and an upwardly extending neck portion 24 in axial alignment with the seat 16 in which the piston 20 has free vertical movement, in clearance relation to the wall of said neck portion 24.

A pressure sealed cover 26 is arranged in the upper end of the neck 24 with a sealing gasket 28, a retainer ring 30 for said gasket and a spacer ring 32 engaged in an internal angular groove in the wall of the neck 24. A retainer plate 34 seated in the upper end of the neck 24 is provided with spaced apertures to receive threaded studs 36 carried by the cover 26 upon which nuts 38 are threaded to provide for initial stressing of the gasket and to secure said plate in connected relationship.

The cover member 26 is provided with a plurality of circumferentially spaced depending stop lugs 40, the purpose of which will be later described.

The wall of the piston 20 at its lower end is provided with a small orifice 42, through which condensates collecting within the piston may drain into the valve outlet 14 to prevent hydraulic lock. However this drain hole is inadequate for the relief of static pressure which may build up above the piston. Preferably the valve body is also provided below the seat 16 with a drain nipple 44.

Externally of the valve body at one side thereof, an equalizer tube 46 is disposed at an angle of substantially 45°. The upper end of this tube is extended through the neck wall of the valve body and connected with the space above the piston 20 between two of the spaced stop lugs 40 on cover member 26. At its lower end the tube 46 extends through the wall of the valve outlet 14 preferably in the plane of its horizontal axis and at a point of low pressure within said outlet. While the lower open end of the equalizer tube 46 may terminate flush with the inner surface of the wall of the outlet 14, it is preferably cut at an angle of 45°, as shown at 48 to provide an elliptical egress opening of the tube having a major axis extending toward the wall of the outlet 14 in the down-stream direction.

From the above description, it will be apparent that as the valve piston is lifted from its seat by the fluid pressure, the static pressure which builds up in the confined space above the piston is relieved through the equalizer tube 46 so that substantially less resistance to the free vertical upward movement of the piston to its full open position will occur. The diameter of the equalizer tube 46 is determined in relation to the piston clearance, and by providing the 45° outlet end on the tube 46 within the valve outlet, advantage is taken of the reverse velocity head of the fluid at this point to obtain a maximum relief of pressure above the piston. It has been found by test that the low pressure area created behind this projecting end 48 of the equalizer tube by the velocity of the fluid reduces the pressure over the piston to a much greater degree than is the case when the outlet end of tube 46 terminates flush with the inner surface of the wall of valve outlet 14.

Figure 5:
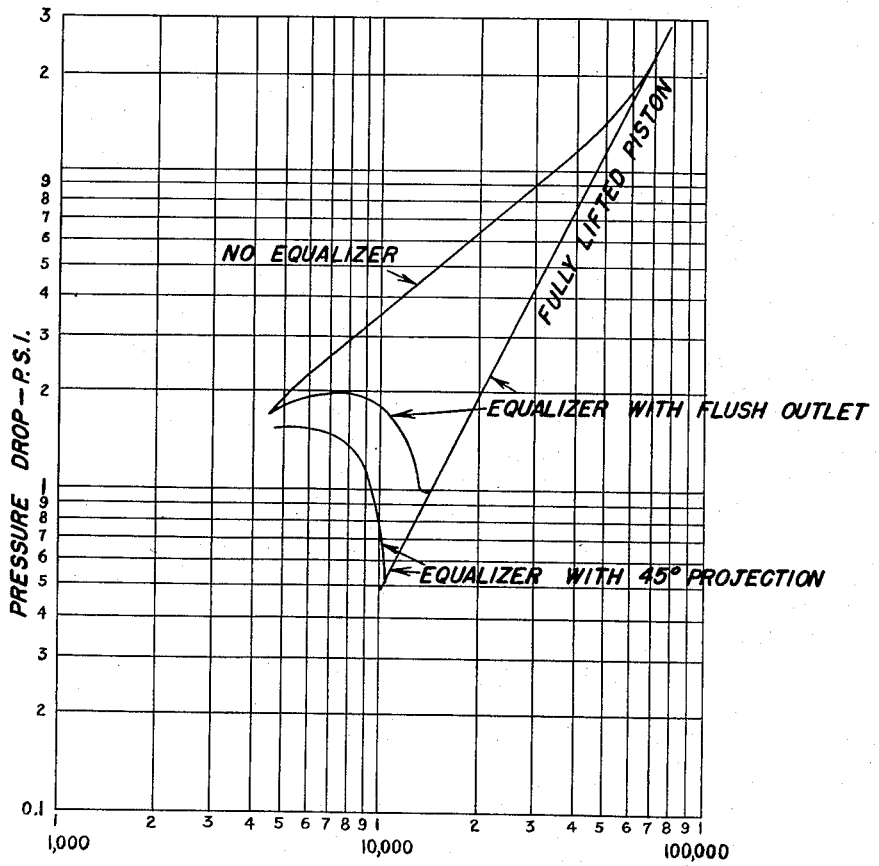

By the provision of the above described equalizer, an appreciable reduction in the overall pressure drop due to increased lift is obtained, as graphically illustrated in Figure 5 of the drawings. In this diagram, the abscissa is a parameter of fluid flow which takes into account the effect of density of the flowing fluid so that the diagram is suitable for water, air, steam or other low viscosity fluids. It will be noted therefrom that at any chosen value of the flow parameter, the pressure drops in the valve outlet, without the equalizer and with the equalizer having a flush outlet and with the 45° outlet projection, may be readily compared and it is seen therefrom that in the latter case the pressure drop is materially less than when no equalizer is provided or when the outlet end of the equalizer tube is flush with the line of flow of the fluid through the valve outlet 14.

The reduced pressure drop in some cases may not be as important as the extended range of flow over which the valve will operate in its full open position without exceeding a maximum allowable pressure drop. Where long periods of operation at reduced loads are required, by rigidly retaining the valve in its full open position, the vibration and wear which are inherent in a partially open valve is eliminated, thus materially prolonging the useful life of the valve. This result is obtained by the provision of the stop lugs 40 which contact the upper end of the valve piston at a plurality of spaced points to limit lifting of the valve so that it will not close the inlet end of the equalizer tube 46. The valve piston is therefore also stabilized in its full open position against vibration relative to the wall of the neck 24 and excessive wear by contact with said wall is prevented.

Figure 6:
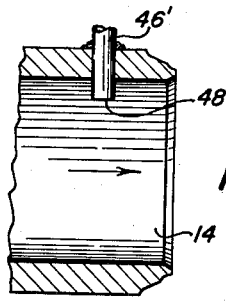
Figure 5 is a diagram showing the relatively low pressure drop obtained by means of the present invention and Figure 6 is a detail section similar to Figure 4 showing a slightly modified form of the invention.

In Figure 6 of the drawings the equalizer tube 46' is projected radially into the outlet passage 14 of the valve and has its open end 48' disposed in parallel relation to the line of flow stream and normal to the tube axis. Thus a velocity component parallel to the axis of the tube and radial to the outlet 14 will be set up with a reduction in pressure at this point. While this arrangement does not utilize as much negative velocity pressure as the 45° tube outlet shown in Figure 4 it may be found quite satisfactory for certain valve applications.

From the foregoing it will be evident that the present invention provides means for materially increasing the utility and efficient operation of check valves of the piston type. The equalizer greatly extends the range of fluid flows over which the valve piston will effectively operate to its fully open position, with a minimum pressure drop through the valve. It will also be apparent that the improved equalizer may be readily applied to either angle or globe check valves of standard construction, without material alteration thereof and at very small cost. Also the external pressure equalizer tube may be easily applied to existing installations of such valves without removal thereof. Of course in such case the cover for the valve piston chamber would be removed and the above described cover member 26 substituted therefor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a valve having a hollow body provided with an inlet passage and an outlet passage and an internal valve seat therebetween, a gravity seated free floating valve element adapted to be urged away from said seat by fluid flowing through the valve body, a tubular piston on said valve element of substantially the same diameter as said valve element, a cylindrical chamber in said body above said valve seat snugly slidably receiving and guiding said piston in its movement to and away from said valve seat, an unobstructed pressure equalizing conduit connecting the upper end of said chamber with the outlet passage of the valve body, said conduit having a terminal portion projecting inwardly from the internal surface of the body into the outlet passage and into the path of fluid flow therethrough so that a reduced pressure region is provided in said chamber by fluid flow past the end of said terminal portion, and stop means in the upper end of said chamber adapted to engage the annular upper edge of said tubular piston in substantial alignment with the peripheral edges of said valve element to stabilize the piston against vibration relative to the chamber wall and prevent closure of said pressure equalizing conduit.

2. The combination defined in claim 1, in which said stop means comprises circumferentially spaced stop lugs on a cover member for said chamber.

3. The combination defined in claim 1, wherein the said projecting terminal portion of said passage is substantially normal to the line of fluid flow and has an elliptical egress opening with the major axis thereof extending toward the wall of the valve outlet in the down-stream direction.

4. The combination defined in claim 3, in which the major axis of said egress opening is disposed at an angle of substantially 45° with respect to the axis of the valve outlet.

5. In a valve having a hollow body provided with an inlet passage and an outlet passage and an internal valve seat therebetween; a gravity seated free floating valve element adapted to be urged away from said seat by fluid flowing through the valve body; a piston on said valve element; means forming a cylindrical chamber in said body above said valve seat for snugly slidably receiving and guiding said piston in its movement to and away from said seat; means forming an annular recess in the wall of said chamber adjacent its outer end; a removable segmented locking ring seated in said recess and forming an annular shoulder in said chamber; a closure member having a reduced portion fitting within said locking ring to retain it in said recess and an enlarged flange spaced from and below said locking ring; a gasket between said flange and the locking ring, said gasket and said flange having opposed surfaces making an acute angle with said chamber; a retainer plate overlying the outer end of said chamber; connecting means between said retainer plate and said closure member operable to move said closure member toward said locking ring to compress said gasket; an unobstructed conduit connecting said chamber with the outlet passage of the valve body, said conduit having a terminal portion projecting inwardly from the internal surface of the body into the outlet passage and into the path of fluid flow therethrough so that a reduced pressure region is provided in said chamber by fluid flow past the end of said terminal portion whereby the static and kinetic pressure of fluid flowing through said passage assists in the opening, stabilizing and closing of said valve element; and stop means in the upper end of said chamber adapted to engage said piston whereby the piston is stabilized against vibration relative to the chamber wall and closure of the pressure equalizing conduit is prevented and the conduit is effective to urge the stop means against the closure in the open position of the valve element to increase the sealing effectiveness of said gasket.

6. The combination defined in claim 5 wherein said projecting terminal portion of said passage is substantially normal to the line of fluid flow and has an elliptical egress opening with the major axis thereof extending toward the wall of the valve outlet in the downstream direction.

7. The combination defined in claim 6 in which the major axis of said egress opening is disposed at an angle of substantially 45° with respect to the axis of the valve outlet.

8. A valve comprising, a hollow body of integral one-piece construction having an inlet passage and an outlet passage connected by a main fluid passage, said inlet and outlet passages merging smoothly into said main fluid passage and said main fluid passage having smoothly curved surfaces to facilitate the free and unobstructed flow of fluid therethrough; a valve seat at the juncture of said main passage and said inlet passage; a valve member adapted to be moved away from said seat under the influence of normal fluid flow through said body from said inlet to said outlet passage, said valve member including a hollow piston rigid with said valve member; means in said body forming a guide cylinder for said piston opposite said seat, said cylinder terminating at its inner end in the wall of said main fluid passage, the valve member forming with a portion of said cylinder a separate chamber in said body; means adjacent the upper end of said cylinder forming an annular downwardly facing shoulder; a closure member having a first portion movably received in said cylinder below said shoulder and a reduced portion extending into said shoulder forming means; a sealing gasket positioned between said shoulder and said first portion of said closure; means for urging said closure toward said shoulder to compress said gasket; a continuously open passage connecting the upper end of said chamber with the interior of said valve body at a point downstream of said seat for withdrawing fluid from said chamber; means forming a terminal portion of said continuously open passage projecting into the stream of fluid flowing through said valve body, said terminal portion of said passage having at its upstream side an obstruction to said stream, and having at its downstream side an opening to discharge fluid withdrawn from said chamber, and means for limiting movement of said valve member away from said seat to prevent the closure of said continuously open passage by said piston and to stabilize said valve member in its fully raised position, whereby said passage is continuously operative during said normal flow of fluid to remove fluid from said chamber thereby minimizing the pressure drop through said valve.

References Cited in the file of this patent

UNITED STATES PATENTS

| Number | Name | Date |
|---|---|---|
| Re. 19,088 | Carson | Feb. 20, 1934 |
| 623,577 | St. Clair | Apr. 25, 1899 |
| 817,470 | Cole | Apr. 10, 1906 |
| 1,046,548 | Bloom | Dec. 10, 1912 |
| 1,052,172 | Rateau | Feb. 4, 1913 |
| 1,438,811 | Coyne | Dec. 12, 1922 |
| 1,555,817 | Anderson | Oct. 6, 1925 |
| 1,685,866 | Raymond | Oct. 2, 1928 |
| 1,922,954 | Hughes | Aug. 15, 1933 |
| 1,941,701 | MacLean | Jan. 2, 1934 |
| 1,981,576 | Woolfenden | Nov. 20, 1934 |
| 2,171,190 | Polston | Aug. 29, 1939 |
| 2,223,699 | Norgren | Dec. 3, 1940 |
| 2,239,116 | Ray | Apr. 22, 1941 |
| 2,328,007 | Griswold | Aug. 31, 1943 |
| 2,385,664 | Warner | Sept. 25, 1945 |
| 2,440,027 | Stoyke | Apr. 20, 1948 |
| 2,475,857 | Reinert | July 12, 1949 |
| 2,532,123 | Shafer | Nov. 28, 1950 |
| 2,665,877 | MacGregor | Jan. 12, 1954 |

FOREIGN PATENTS

| Number | Country | Date |
|---|---|---|
| 17,896 | Great Britain | Aug. 5, 1911 |
| 721,200 | France | 1932 |